US007406686B2

(12) United States Patent
Liu et al.

(10) Patent No.: US 7,406,686 B2
(45) Date of Patent: Jul. 29, 2008

(54) SYSTEMS AND METHODS FOR SOFTWARE PERFORMANCE TUNING

(75) Inventors: James Liu, Sunnyvale, CA (US); Raghavender Pillutla, San Jose, CA (US); Chien-Hua Yen, Los Altos, CA (US); Timothy Mac, San Jose, CA (US); Yousef Yacoub, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 671 days.

(21) Appl. No.: 10/457,977

(22) Filed: Jun. 9, 2003

(65) Prior Publication Data

US 2004/0250234 A1    Dec. 9, 2004

(51) Int. Cl.
G06F 9/44    (2006.01)
G06F 9/45    (2006.01)

(52) U.S. Cl. .................. 717/151; 717/127; 717/155

(58) Field of Classification Search ............ 717/131, 717/145–147, 124–129, 149–155
See application file for complete search history.

(56) References Cited

U.S. PATENT DOCUMENTS

| | | | |
|---|---|---|---|
| 4,885,654 A | 12/1989 | Budyko et al. | |
| 5,530,964 A * | 6/1996 | Alpert et al. | 717/158 |
| 5,797,019 A | 8/1998 | Levine et al. | |
| 5,835,765 A | 11/1998 | Matsumoto | |
| 5,848,274 A * | 12/1998 | Hamby et al. | 717/153 |
| 6,026,236 A * | 2/2000 | Fortin et al. | 717/127 |
| 6,216,197 B1 * | 4/2001 | Rocchetti et al. | 711/2 |
| 6,263,488 B1 * | 7/2001 | Fortin et al. | 717/127 |
| 6,357,039 B1 * | 3/2002 | Kuper | 717/136 |
| 6,539,396 B1 | 3/2003 | Bowman-Amuah | |
| 6,546,548 B1 * | 4/2003 | Berry et al. | 717/128 |
| 6,606,744 B1 | 8/2003 | Mikurak | |
| 6,671,876 B1 | 12/2003 | Podowski | |
| 6,763,395 B1 | 7/2004 | Austin | |
| 6,772,411 B2 * | 8/2004 | Hayes et al. | 717/127 |
| 6,801,940 B1 | 10/2004 | Moran et al. | |
| 6,823,507 B1 * | 11/2004 | Srinivasan et al. | 717/152 |
| 6,954,923 B1 * | 10/2005 | Yates et al. | 717/130 |
| 6,957,424 B2 * | 10/2005 | Stecher | 717/151 |
| 6,968,545 B1 * | 11/2005 | Krech et al. | 717/153 |
| 6,986,130 B1 * | 1/2006 | Boucher | 717/151 |

(Continued)

OTHER PUBLICATIONS

Wu et al, "Performance modeling from software components", ACM WOSP, pp. 290-301, 2004.*

(Continued)

Primary Examiner—Anil Khatri
(74) Attorney, Agent, or Firm—Dorsey & Whitney LLP

(57) ABSTRACT

Methods and apparatus for determining a level of performance of a first application in a computer system are disclosed. A selection of a second one of a plurality of applications is received. The second application is then executed, thereby producing data indicating one or more levels of performance of the first application. Documentation is then provided, where the documentation is associated with the second application and indicates at least one of a manner of interpreting data indicating one or more levels of performance of the first application and suggesting one or more of the plurality of applications that can provide additional information to assess one or more levels of performance of the application.

29 Claims, 13 Drawing Sheets

U.S. PATENT DOCUMENTS

| | | | |
|---|---|---|---|
| 6,996,804 B2* | 2/2006 | Stoodley | 717/116 |
| 7,007,270 B2* | 2/2006 | Martin et al. | 717/131 |
| 7,010,779 B2 | 3/2006 | Rubin et al. | |
| 7,013,456 B1* | 3/2006 | Van Dyke et al. | 717/130 |
| 7,017,153 B2* | 3/2006 | Gouriou et al. | 717/158 |
| 7,020,697 B1 | 3/2006 | Goodman et al. | |
| 7,117,261 B2 | 10/2006 | Kryskow, Jr. et al. | |
| 7,143,133 B2* | 11/2006 | Liu et al. | 709/203 |
| 7,194,732 B2 | 3/2007 | Fisher et al. | |
| 2003/0093772 A1 | 5/2003 | Stephenson | |
| 2004/0003375 A1 | 1/2004 | George | |
| 2004/0117760 A1 | 6/2004 | McFarling | |
| 2004/0250235 A1 | 12/2004 | Liu et al. | |
| 2005/0021655 A1 | 1/2005 | Liu et al. | |
| 2006/0277509 A1 | 12/2006 | Tung et al. | |

OTHER PUBLICATIONS

Sharma et al, "Architecture based analysis of performance reliability and security of software systems", ACM WOSP pp. 217-227, 2005.*

Zheng et al, "Fast estimation of probabilities of soft deadlines misses in layered software performance models", ACM WOSP pp. 181-186, 2005.*

Hondroudakis et al, "An empirically derived framework for classifying parallel program performance tuning problems", ACM SPDT, pp. 112-123, 1998.*

Singhal et al, Architectural support for performance tuning a case study on SPARCenter 2000, IEEE, pp. 48-59, 1994.*

Kevin Kline, Baya Pavliashvili, "Application Performance Tuning," Jul. 12, 2002, http://216.239.57.104/search?q=cache:9wGa6HQnYAsJ:www.informit.com/content/index... downloaded from the Internet on Oct. 5, 2004.

Linda Schneider, "Sun Java System Message Queue Software Performance Tuning: An Overview," http://developers.sun.com/sw/docs/articles/integration/tuning_overview.html downloaded from the Internet on Oct. 5, 2004.

"Using Input and Output Streams," http://scv.bu.edu/Doc/Java/tutorial/java/io/streampairs.html downloaded from the Internet on Oct. 5, 2004.

"Class java.io.PipedInputStream" http://stein.cshl.org/jade/distrib/docs/java.io.PipedInputStream.html downloaded from the Internet on Oct. 5, 2004.

"Package java.io" http://java.sun.com/j2se/1.4.2/docs/api/java/io/package-summary.html downloaded from the internet on Oct. 5, 2004.

"Class java.io.PipedOutputStream" http://publib.boulder.ibm.com/infocenter/wsphelp/topic/com.sun.api.doc/java/io/PipedOut... downloaded from the Internet on Oct. 5, 2004.

"Servertec IO Object" http://www.servertec.com/products/iscript/docs/IO.html downloaded from the Internet on Oct. 5, 2004.

Beach et al., "An Integrated Manufacturing Data Management System", IEEE, pp. 306-311, Oct. 1990.

Haddox et al., "An Approach for Understanding and Testing Third Party Software Components", IEEE, pp. 239-299, 2002.

Huang et al., Software Rejuvenation: Analysis, Module and Applications, IEEE, pp. 381-390, Jun. 1995.

Randall et al., "Adaptable Technique for Collecting MWD Density Logging Research Data Using Windows Software", IEEE, vol. 1, pp. 633-635, Oct. 1992.

* cited by examiner

Probe Specifications ← 502

| UserID: 504 |
|---|
| Email: 506 |
| Name: 508 |
| Synopsis: 510 |
| Description: 512 |
| Source: 514 |
| Executable: 516 |
| Keywords: 518 |
| Invocation: 520 |
| Pre-requisite: 522 |
| Notes: 524 |

*FIG. 5*

Hash Table 804

| Key | Address or reference to address |
|---|---|
| cpustat | Byte array 1 |
| kstat | Byte array 2 |

*FIG. 9*

Lookup Table 806

| Key | Address or reference to address |
|---|---|
| cpustat | Byte array 1 |
| kstat | Byte array 2 |

*FIG. 10*

SYSTEMS AND METHODS FOR SOFTWARE PERFORMANCE TUNING

CROSS REFERENCE TO RELATED APPLICATIONS

This invention is also related to U.S. patent application Ser. No. 10/457,848, filed on the same day as this patent application, naming Liu et al. as inventors, and entitled "SYSTEM FOR EFFICIENTLY ACQUIRING AND SHARING RUNTIME STATISTICS." That application is incorporated herein by reference in its entirety and for all purposes.

This application is also related to U.S. patent application Ser. No. 10/458,508, filed on the same day as this patent application, naming Liu et al. as inventors, and entitled "METHODS AND APPARATUS FOR ENHANCED STATISTICAL PERFORMANCE." That application is incorporated herein by reference in its entirety and for all purposes.

BACKGROUND OF THE INVENTION

1. Field of the Invention

The present invention relates generally to computer software. More particularly, the present invention relates to methods and apparatus for performing software performance tuning.

2. Description of Related Art

Software engineers are often under significant time constraints during the generation of a software tool or product. However, even once the software has been generated, the software cannot yet be released or shipped. In fact, one of the most time consuming phases of the software generation process is often the software testing process.

The process of assessing and tuning the current level of performance of software is often referred to as "software performance tuning." For instance, software performance tuning may be used to test a software application that is run on the underlying computer system or that is a part of the underlying system (e.g., operating system). The resulting data is then analyzed to ascertain the causes of undesirable performance characteristics, such as the speed with which the particular software application is executed.

Software performance tuning has been long considered an art more than a science. Primarily, it typically requires tremendous expertise of its practitioners to both diagnose performance issues and resolve them. Performance issues may be caused by poor software application implementation or algorithms. However, often, performance issues may be caused by idiosyncratic behavior due to hardware, operating environment (e.g., operating system), or even compilers. Accordingly, the mastery of such an art often requires significant breadth and depth of knowledge and experience.

Various monitoring tools are currently available for the purpose of assessing the software performance of a software application being executed. These monitoring tools often generate a significant amount of runtime data. This runtime data is then manually assessed in order to identify undesirable performance characteristics of the software. Software performance tuning has therefore traditionally been a time-consuming process.

Many operating systems are shipped to customers with built-in monitoring tools that are used to assess software performance issues of software being executed on these operating systems. However, since these monitoring tools are designed to run with a particular operating system and each vendor platform varies, a software developer is often unfamiliar with these monitoring tools. As a result, the software developer may have difficulty running the monitoring tool. In addition, the amount of data generated by these monitoring tools is often inappropriate for the purpose needed. For instance, a particular monitoring tool may produce an unnecessarily large amount of data, or an insufficient amount of data. Moreover, it is often difficult to understand the runtime or output data that is generated by these monitoring tools. Software tuning engineers are therefore often needed in order to gain expertise in executing these monitoring tools, as well as analyzing the data that is generated by these monitoring tools.

Another shortcoming of existing monitoring tools is the type and quality of the data that is generated by the monitoring tools. Specifically, often the data that is generated is absolute data (e.g., number of bits) rather than relative or derived data (e.g., number of bits per second). In other words, the data often requires further analysis in order to ascertain the performance (e.g., speed) of the software being tested. In addition, runtime data may be obtained in accordance with a variety of methods, and therefore the data that is generated is often inaccurate.

Existing software monitoring tools are often referred to as "profilers." These software profiles generally collect runtime performance data during the execution of a particular software application, and then presents the runtime data. Exemplary profilers include the Collector and Analyzer bundled with SunONE Studio software, available from Sun Microsystems, Inc. located in Menlo Park, Calif., the Jprobe Java™ profiler available from Sitraka/Quest located in Irvine, Calif., and OptimizeIt available from Borland located in Scotts Valley, Calif. Through the use of such profilers, it is possible to ascertain those portions of the software functionality that consume the most system resources and/or time.

Some profilers currently available run similarly to many debugging tools. Specifically, it is possible to interactively step through software being executed. However, such a process is often time-consuming. The user then individually and manually identifies those portions of the software that are problematic. In addition, the user has limited control over the testing process. In fact, many software profilers are run in batch mode without enabling the user to control the software testing process. The user is then left to the tedious and time consuming process of analyzing the large amount of data generated. In addition, such profilers typically generate data in a specific manner. Due to the rigid requirements of conventional profilers, it is difficult to customize the software performance tuning process.

In view of the above, it would be desirable to simplify the performance tuning process. Moreover, it would be beneficial if the accuracy of the data generated during software performance tuning process could be improved.

SUMMARY

Methods and apparatus for determining a level of performance such as speed of execution of an application are disclosed. The application may be, for example, a user application or system utility. This is accomplished through providing an interactive system that is easily integratable for assisting the user in software performance tuning.

In accordance with one aspect of the invention, methods and apparatus for determining a level of performance of an application are disclosed. A selection of a second one of a plurality of applications (e.g., probes) is received. The second application is then executed, thereby producing data indicating one or more levels of performance of the first application. Documentation is then provided, where the documentation is associated with the second application and indicates at least one of a manner of interpreting data indicating one or more levels of performance of the first application and suggesting one or more of the plurality of applications that can provide additional information to assess one or more levels of performance of the application. The user may then select and execute one of the suggested applications in order to further assess the performance of the application being tested.

In accordance with another aspect of the invention, data associated with the second application (e.g., probe) that has been executed is displayed. For instance, the data may be displayed in a graphical or tabular format. The data that is displayed may be that generated by the second application. Alternatively, the data generated by the second application may be captured (e.g., by a Java wrapper). A portion of the data may therefore be optionally discarded. In addition, one or more arithmetic operations may be performed on at least a portion of the data. In this manner, averaged or derived data (e.g., indicating speed) may be obtained. This modified data may be displayed in addition to, or instead of, the initial data generated by the probe.

BRIEF DESCRIPTION OF THE DRAWINGS

The invention, together with further advantages thereof, may best be understood by reference to the following description taken in conjunction with the accompanying drawings in which:

FIG. 5 is a diagram illustrating a format for submitting probe specifications in accordance with various embodiments of the invention.

FIG. 9 is a diagram illustrating an exemplary hash table used to manage output streams in accordance with various embodiments of the invention.

FIG. 10 is a diagram illustrating an exemplary lookup table used to manage input streams in accordance with various embodiments of the invention.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Various software performance criteria may be analyzed through the use of such a software performance tuning tool. For instance, software characteristics such as speed (e.g., bits/second) may be assessed. Three exemplary types of data may be collected, calculated and/or analyzed by such a software performance tool. First, absolute data such as a cycle count or instruction count may be collected. Second, relative data such as cycle count in the last 5 seconds may be collected. In other words, relative data is absolute data that is relative to other criteria or data, such as time. Third, derived data such as cycle count/instruction count (CPI) may be collected. In other words, derived data is derived from other absolute data. In accordance with various embodiments of the invention, software characteristics may be interactively obtained and assessed.

Figure 1:
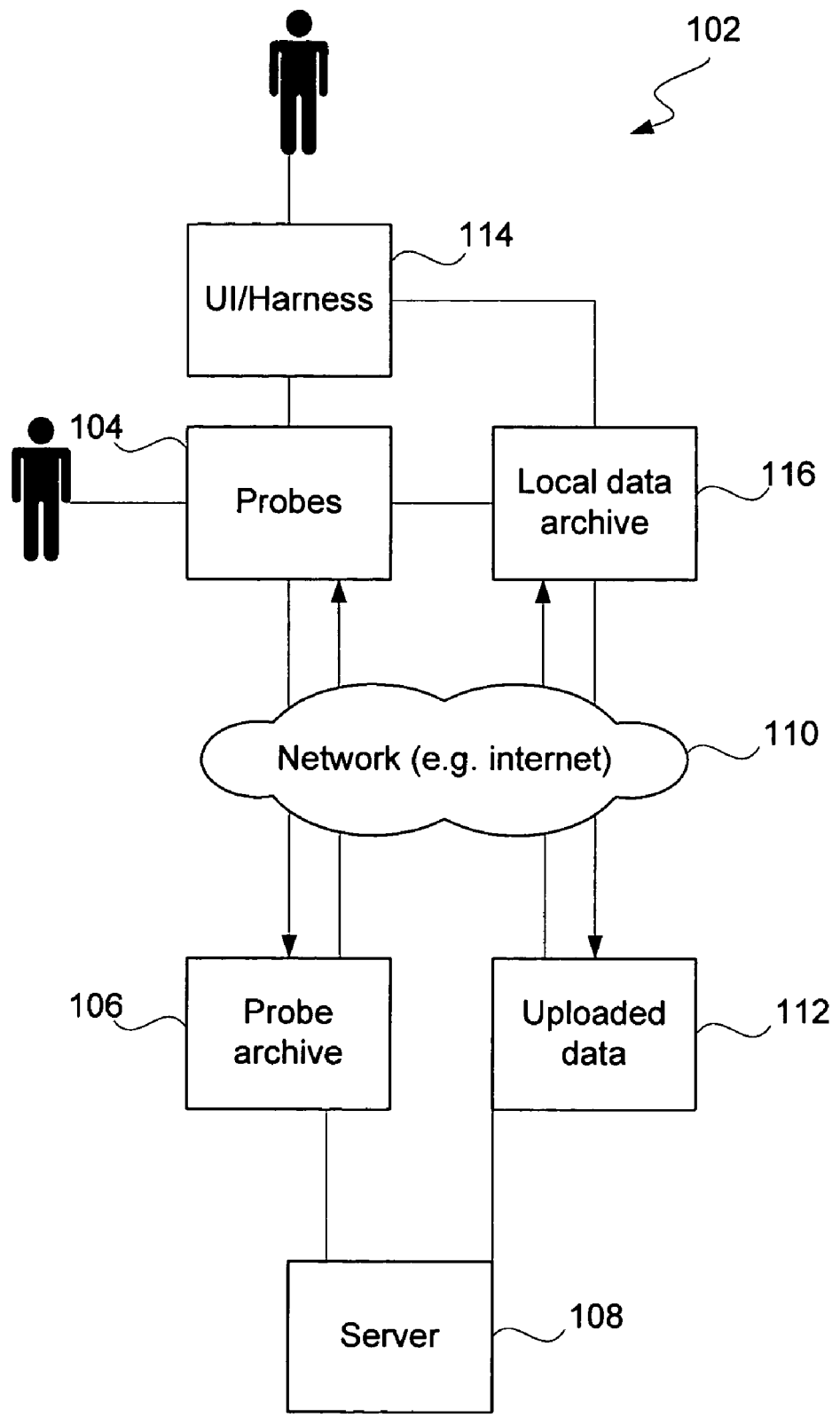
FIG. 1 is a block diagram illustrating a system for performing software performance tuning in accordance with various embodiments of the invention.

FIG. 1 is a block diagram illustrating a system 102 for performing software performance tuning in accordance with various embodiments of the invention. One or more probes 104 (i.e., applications) are provided which each produce data assessing one or more levels of performance of an application. For instance, the data may include one or more software characteristics such as those described above. The probes 104 may be stored locally and/or in a probe archive 106 on a remotely located server 108 accessible via a network such as the Internet 110. Probes may be manually or automatically downloaded (or updated) from the probe archive 106 as well as uploaded to the probe archive 106. For instance, various individuals may upload a probe to be included in the archive. Each probe that is uploaded is preferably reviewed prior to its inclusion in the probe archive. A set of probe specifications such as those described below with reference to FIG. 5 are preferably uploaded with each probe to enable the probe to be evaluated prior to its inclusion in the probe archive. In addition, it may be desirable to limit access to probes in the probe archive 106 as well as uploaded data 112 to one or more individuals or customers. Thus, a key or password may be used to access probes as well as uploaded data.

In order to run a probe, a graphical user interface 114 (i.e., user harness) is provided. Alternatively, a user may wish to run a probe without using the graphical user interface 114, such as through the use of a command line (e.g., UNIX™ Prompt). One or more probes may be executed sequentially or in parallel. Alternatively, a scheduler may be used to automate the lifecycle of one or more probes. The data generated and intercepted by each of these probes may then be stored in a local data archive 116. This data may be displayed as well as analyzed to assess the application being tested, as well as used to identify one or more additional probes to be executed for further analysis of the System Under Test (SUT). The data may be displayed in a variety of formats, such as a tabular or graph format.

Figure 2:
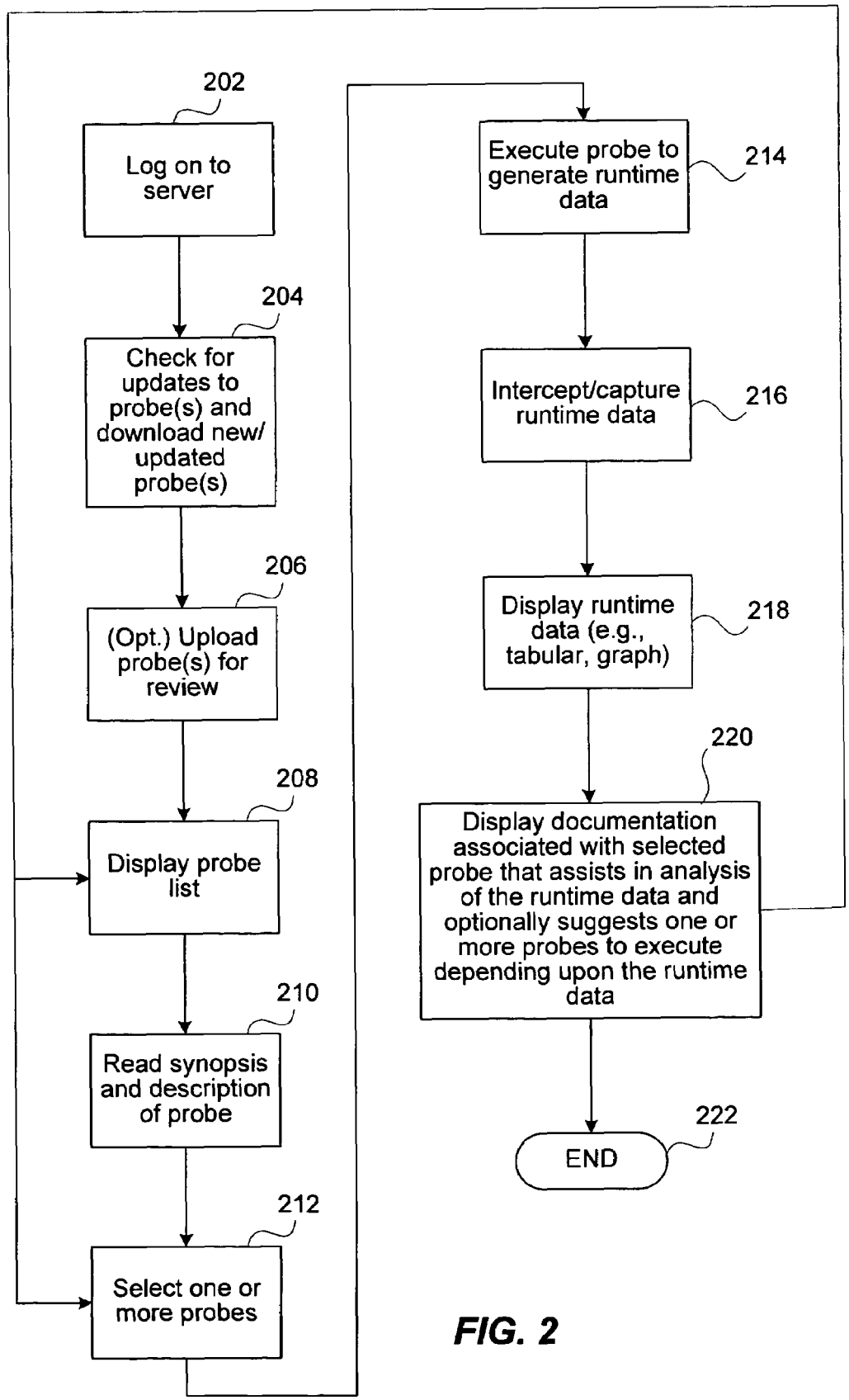
FIG. 2 is a process flow diagram illustrating a method of performing software performance tuning in accordance with various embodiments of the invention.

FIG. 2 is a process flow diagram illustrating a method of performing software performance tuning in accordance with various embodiments of the invention. The user first logs onto the server 202 via the Internet at block 202. One or more probes are then downloaded and/or updated at block 204. For instance, there may be new probes that have been added to the probe archive or updated, requiring the new probes or updated probes to be downloaded. In addition, the user may also wish to upload one or more probes for review and inclusion in the probe archive at block 206.

A probe list listing one or more available probes (e.g., available for execution by a particular customer or all customers) is then displayed at block 208 from which the user may select one or more probes to execute. The user may wish to view probe specifications associated with the probe at block 210. For instance, the user may wish to read a synopsis of functions performed by the probe, as well as a detailed description of the probe (e.g., functionality, execution instructions, and/or expected output) at block 210. The user may then select one or more probes to execute at block 212.

In accordance with one embodiment, each probe supports Standard Input (STDIN) and Standard Output (STDOUT) for normal logging functions and diagnostic text, if produced. In addition, error and administration messages are sent to Standard Error (STDERR). In addition, one or more probes are optionally invoked through a single command at the shell command line. No additional commands should be required to be executed other than this single command to generate the probe output. In accordance with various embodiments, a property file that defines the runtime environment of the probe(s) is defined by the user prior to invoking the probe(s).

When a probe is executed at block 214, it generates runtime data (e.g., output data). For instance, data may be obtained from a register. The types of data that may be generated and/or calculated by a probe include absolute data, relative data, and derived data. The presentation of the data is in ASCII format. Generally, a probe samples data over a period of time and averaged. This data is intercepted at block 216. The data may be obtained from a log file, which may also include associated diagnostic text. It may be desirable to discard a portion of the data and/or perform one or more arithmetic operations on the data. This may be accomplished, for example, through the use of a Java wrapper, as will be described in further detail below with reference to FIG. 6. The original and/or modified data may then be displayed at block 218. For instance, the data may be displayed in tabular or graphical format. Documentation associated with the selected probe is then displayed at block 220. For instance, the documentation may indicate a manner of interpreting the data assessing one or more levels of performance of the application. As another example, the documentation may suggest one or more probes to execute that can provide additional information to assess one or more levels of performance of the application being tested (e.g., SUT). The documentation may be a single set of documentation associated with the selected probe. Thus, the documentation may provide multiple sets of documentation, where each set of documentation is associated with a different range of values of data produced by the probe. The user may then interpret the appropriate set of documentation as indicated by the output results. For instance, each probe suggested may correspond to a specified range of output data values, which may be different or the same as other probe(s) that are recommended. Alternatively, the documentation that is provided may correspond to a particular range of values of the data produced by the probe. In other words, multiple sets of documentation may be associated with a particular probe from which the appropriate set of documentation is presented depending upon the range of values of data produced by the probe. The documentation may also be incorporated into a rules engine, which will automate the execution of further probes and will not make it mandatory to read the documentation to proceed further. In other words, the rules engine may determine which probe(s) to automatically execute based upon the results of data values produced by the probe.

Once the documentation is provided, the user may select one or more probes to execute to further test the application. For instance, the user may wish to select one or more probes from the probe list as described above at block 208. The user may also wish to select one or more probes that have been recommended in the documentation presented to the user. These probes may be selected from the probe list or, alternatively, they may be executed at block 212 by clicking on a link (e.g., URL) provided in the documentation. The process ends at block 222.

Figure 3:
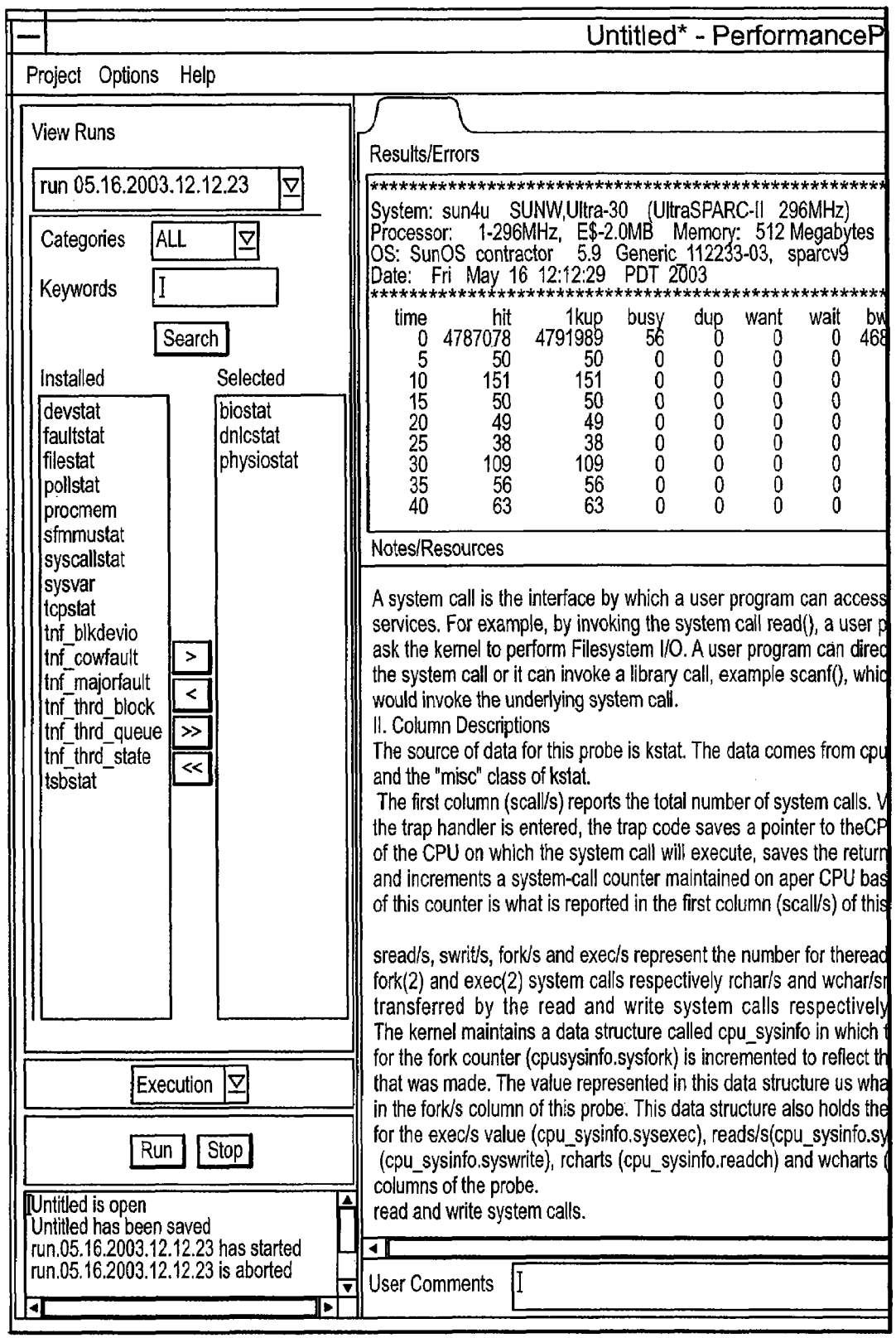
FIG. 3 is a screen shot illustrating runtime data that may be generated by a probe in accordance with various embodiments of the invention.

FIG. 3 is a screen shot illustrating runtime data that may be generated by a probe in accordance with various embodiments of the invention. As shown in FIG. 3, a user may specify one or more keywords to search for the appropriate probe(s) to execute. These keywords may, for instance, be used to search the probe specifications for the appropriate probe(s) to execute. Exemplary probe specifications will be described in further detail below with reference to FIG. 5. Installed probes are listed in a probe list, which enables a user to select and de-select probes to execute, which are shown as selected probes. In this example, three different probes, biostat, dnlcstat, and physiostat, are selected. When executed, the results (e.g., runtime data or processed runtime data) is presented. Specifically, the user may select a particular set of results, such as by clicking on the appropriate tab. In this example, the results for the probe, biostat, are displayed. In addition, below the results, a set of documentation is presented that corresponds to the probe, biostat, that has been executed. The documentation includes information describing the data presented in the columns, as well as the source of the data that is presented.

Figure 4:
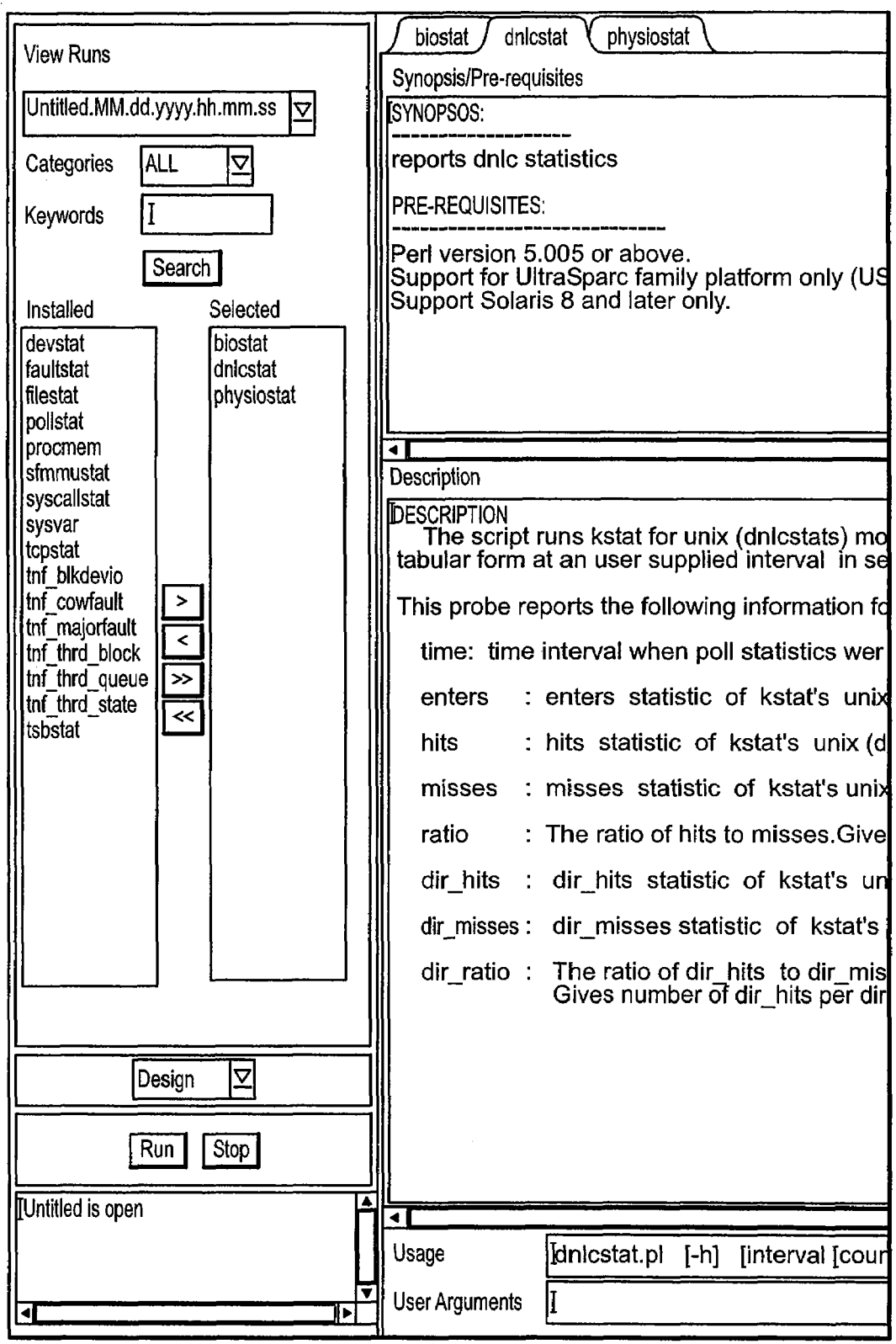
FIG. 4 is a screen shot illustrating graphical user interface for simultaneously executing multiple probes in accordance with various embodiments of the invention.

FIG. 4 is a screen shot illustrating graphical user interface for simultaneously executing multiple probes in accordance with various embodiments of the invention. In order to select multiple probes such as those selected in FIG. 3, the user selects one or more probes from those probes that have been installed. Those probes that have been selected are then presented, as shown. Upon selection, the user may view at least a portion of the probe specifications associated with the probe prior to executing the probe. For instance, as shown, the synopsis, pre-requisites, and detailed description may be viewed. The user may then execute or de-select the selected probe(s). Exemplary probe specifications will now be described with reference to FIG. 5.

FIG. 5 is a diagram illustrating a format for submitting probe specifications 502 in accordance with various embodiments of the invention. The probe may be submitted in any language, such as C, Perl, Java™, or Unix™ shell. As described above, an application that is submitted (e.g., uploaded) is preferably submitted with an associated set of probe specifications 502. Any $3^{rd}$ party tool, system utility or other application can be integrated as a probe. The user submitting the probe is preferably identified in the probe specifications, such as by a userID 504. In addition, contact information for the user such as an email address 506, as well as the name of the user 508 may also be provided. A synopsis 510 and more detailed description 512 of the probe may also be provided. The synopsis 510 is preferably a brief description (e.g., one-line summary) of the probe, such as what data the probe generates (e.g., what functions the probe performs). The detailed description 512 is preferably a more detailed (e.g., multi-lined description) of the probe. This description 512 may include, for example, what functions the probe performs, what data is generated by the probe, what are the required inputs and outputs, and/or an example illustrating execution of the probe. In addition to the executable code 516, the source code 514 is also preferably submitted. The source file(s) are preferably text files with conventional suffixes corresponding to the type of file. The source file(s) also preferably includes a build script, Makefile, detailed README, INSTALL text files, or the equivalent. One or more keywords 518 associated with the probe, a name, method or command for invoking the probe 520, pre-requisite(s) 522 to executing the probe, and any additional notes 524 are also included in the probe specifications. For instance, pre-requisite(s) 522 may, for example, indicate dependencies of the probe (e.g., source code) on other packages such as Perl 5.x. The pre-requisites 522 may also include information such as global variables, memory requirements, CPU requirements, and/or operating system requirements (e.g., operating system type and version(s)). The keywords 518 may, for instance, include a one-line text list of words delimited by spaces that may be used by a search engine to identify probes. Once the probe and associated specifications are submitted, the probe may be included in the probe archive (stored remotely or locally) or rejected by the reviewer upon review of the specifications and/or associated probe.

Each probe is preferably submitted with an associated set of documentation (not shown). As described above, the set of documentation preferably indicates a manner of interpreting the probe results (e.g., data) indicating one or more levels of performance of the application being tested. Specifically, the documentation may explain the probe results as well as methods of interpretation. In addition, the set of documentation preferably suggests execution of one or more probes that can provide additional information to assess one or more levels of performance of the application being tested.

Figure 6:
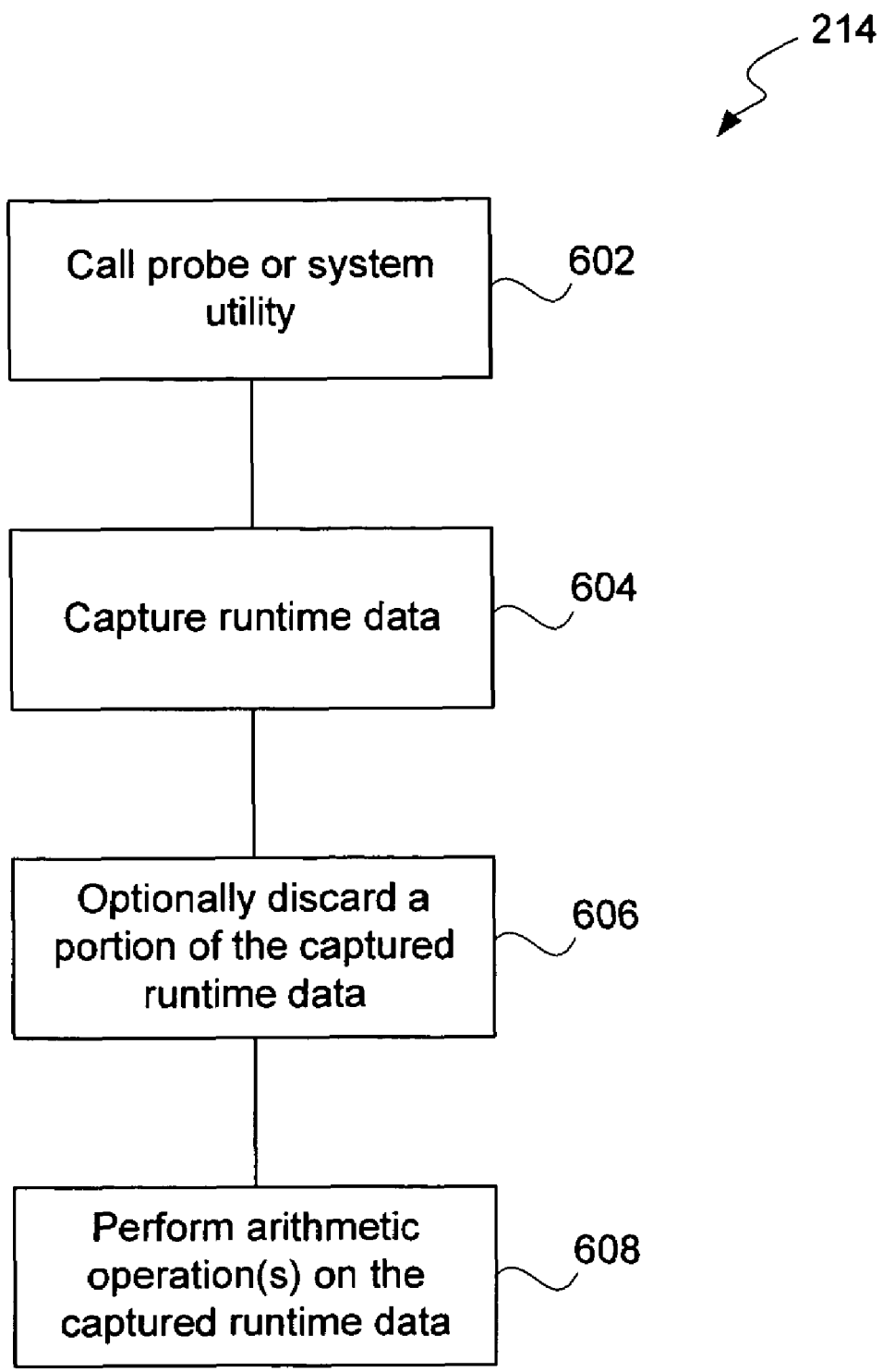
FIG. 6 is a process flow diagram illustrating a method of implementing a probe in accordance with various embodiments of the invention.

FIG. 6 is a process flow diagram illustrating a method of implementing (e.g., executing) a probe as shown at block 214 of FIG. 2 in accordance with various embodiments of the invention. A probe may be executed as submitted by a user. However, it may also be desirable to select a portion of the data produced by a probe and/or perform one or more arithmetic operations on the data. Thus, the probe (e.g., application or system utility) is called at block 602. The runtime or output data is then captured at block 604. A Java wrapper may then be used to optionally discard a portion of the captured data at block 606 and/or perform any desired arithmetic operation(s) on the captured data at block 608. For instance, selected data samples may be obtained and averaged over the samples produced by the probe or selected.

It may be desirable for multiple applications (e.g., probes) to call a single application (e.g., probe or system utility). For instance, multiple probes may wish to call the probe or system utility. However, the underlying hardware may limit the number of processes that may execute simultaneously. Thus, methods and apparatus for acquiring and sharing runtime data and/or statistics are disclosed.

In the described embodiments, an object-oriented system is described. For instance, various described embodiments may be implemented in a Java™ based system that will run independent of an operating system. However, this description is merely illustrative, and alternative mechanisms for implementing the disclosed embodiments are contemplated.

Figure 7:
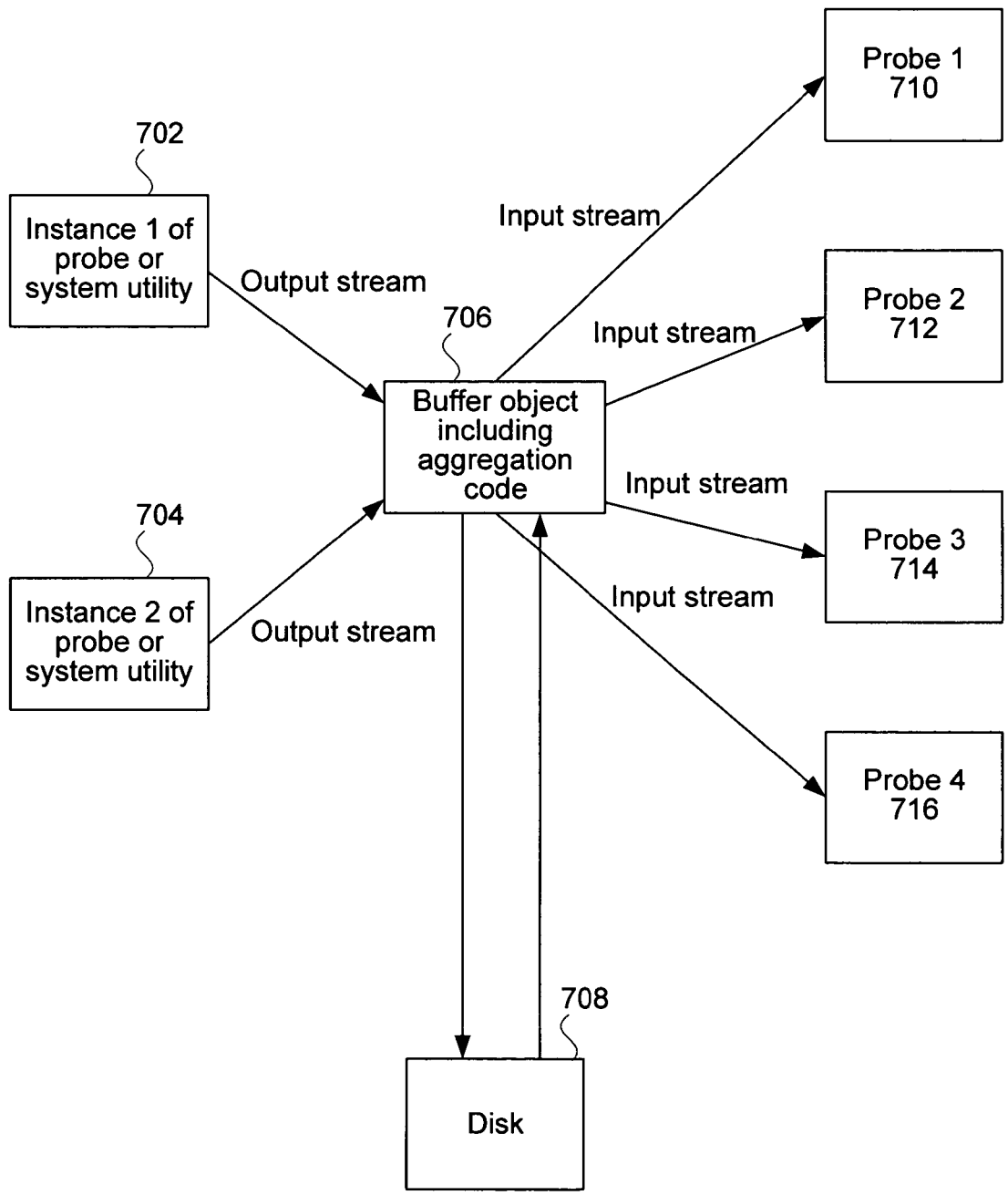
FIG. 7 is a block diagram illustrating a system for acquiring and sharing runtime statistics in accordance with various embodiments of the invention.

FIG. 7 is a block diagram illustrating a system for acquiring and sharing runtime statistics in accordance with various embodiments of the invention. In an object-oriented system, in order to execute a method, the class including the method is instantiated, producing an instance of the class (i.e., object). Thus, as shown at block 702, a first instance of the application (e.g., probe or system utility) is generated and executed. In order to share the data generated by the application, the data is sampled at the lowest common denominator. In other words, the data is sampled at a rate that is higher than or equal to that requested by the probe that receives the data. As a result, if a new probe requests data from the application that is already executing and that probe requires data at a rate greater than that sampled by the first instance, a new second instance of the class including the application is generated, as shown at block 704. Thus, the instance may be of the same or a different probe or utility.

A mechanism for intercepting, storing and distributing this data to the appropriate requesting probe(s) is provided in the form of a buffer object as shown at block 706. The buffer object includes aggregation code that collects the data, stores the data temporarily and/or to a disk 708. The aggregation code distributes the data at the appropriate sampling rate to the probes 710, 712, 714, and 716 provided in the form of a buffer object as shown at block 706. The buffer object includes aggregation code that collects the data, stores the data temporarily and/or stores the data to a disk 708. The aggregation code obtains the data from one or more instances of the application and distributes the data at the appropriate sampling rate to the probes 710, 712, 714, and 716. An exemplary object will be described in further detail below with reference to FIG. 8.

In accordance with one embodiment, an output stream is associated with each instance of the application and an input stream is associated with each probe requesting data from the application. Specifically, an input stream is created through instantiating an instance of the InputStream class of the Java.io package and an output stream is created through instantiating an instance of the OutputStream class of the java.io package. Specifically, an instance of a PipedInputStream and an instance of a PipedOutputStream are generated, which inherit the properties of the InputStream class and OutputStream class, respectively. The piped input and output streams implement the input and output components of a pipe. Pipes are used to channel the output from one program (or thread or code block) into the input of another. In other words, each PipedInputStream is connected to a PipedOutputStream.

Figure 8:
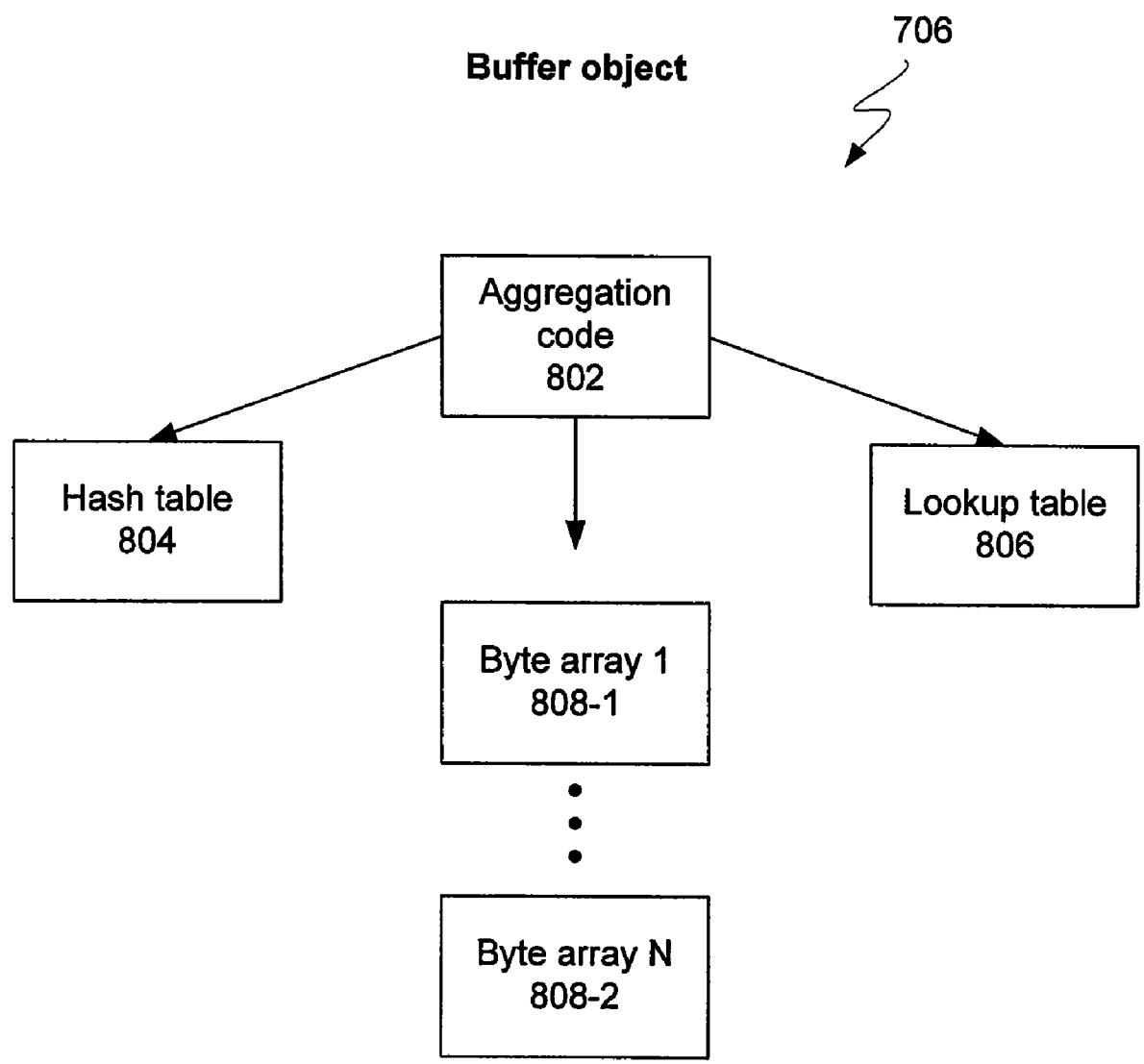
FIG. 8 is a block diagram illustrating a buffer object for managing V/O streams in order to support the acquiring and sharing of runtime statistics in the system of FIG. 7 in accordance with various embodiments of the invention.

FIG. 8 is a block diagram illustrating a buffer object 706 for managing I/O streams in order to support the acquiring and sharing of runtime statistics in the system of FIG. 7 in accordance with various embodiments of the invention. As described above, the buffer object 706 includes aggregation code 802 that provides the appropriate data from the executing application to the appropriate probe(s) requesting data from the application (e.g., attempting to call the application). This is accomplished in various embodiments through the mapping of the input stream(s) to the output stream(s). In this manner, the data is piped from the application to the requesting probe(s).

In order to map the input stream(s) to the output stream(s), a hash table 804 and lookup table 806 are implemented. The hash table 804 tracks the output streams, while the lookup table tracks the input streams 806. As described above with reference to the example of FIG. 7, two output streams collect the data which is delivered to four different probes that are gathering the data via an input stream. An exemplary hash table 804 and lookup table 806 will be described in further detail below with reference to FIG. 9 and FIG. 10, respectively.

When data is obtained, it is stored in one or more byte arrays 808-1 and 808-2. For instance, each byte array may correspond to a different output stream or probe. Historical data (e.g., data previously obtained and transmitted to the probe(s)) may be successively stored to disk as new data is stored in the byte arrays.

FIG. 9 is a diagram illustrating an exemplary hash table 804 as shown in FIG. 8 used to manage output streams in accordance with various embodiments of the invention. Specifically, for each output stream, an entry is maintained in the hash table 804. As shown, for each output stream, the entry includes a key identifying the instance of the application being executed and an address or reference to an address storing data generated by the instance of the application. For example, the key cpustat corresponding to an instance of the application cpustat corresponds to byte array 1, while the key kstat corresponding to an instance of the application kstat corresponds to byte array 2. In this manner, it is possible to store data for the appropriate application or instance and track the data for the application or instance.

FIG. 10 is a diagram illustrating an exemplary lookup table 806 as shown in FIG. 8 used to manage input streams in accordance with various embodiments of the invention. Specifically, for each input stream, an entry is maintained in the lookup table 806. As shown, for each input stream, the entry includes a key identifying the instance of the application being executed and an address or reference to an address storing data generated by the instance of the application. For example, the key cpustat corresponding to an instance of the application cpustat corresponds to byte array 1, while the key kstat corresponding to an instance of the application kstat corresponds to byte array 2. In this manner, it is possible to retrieve data for the appropriate application or instance. Moreover, through the use of the lookup table together with the hash table, an output stream may be piped through multiple input streams.

Figure 11:
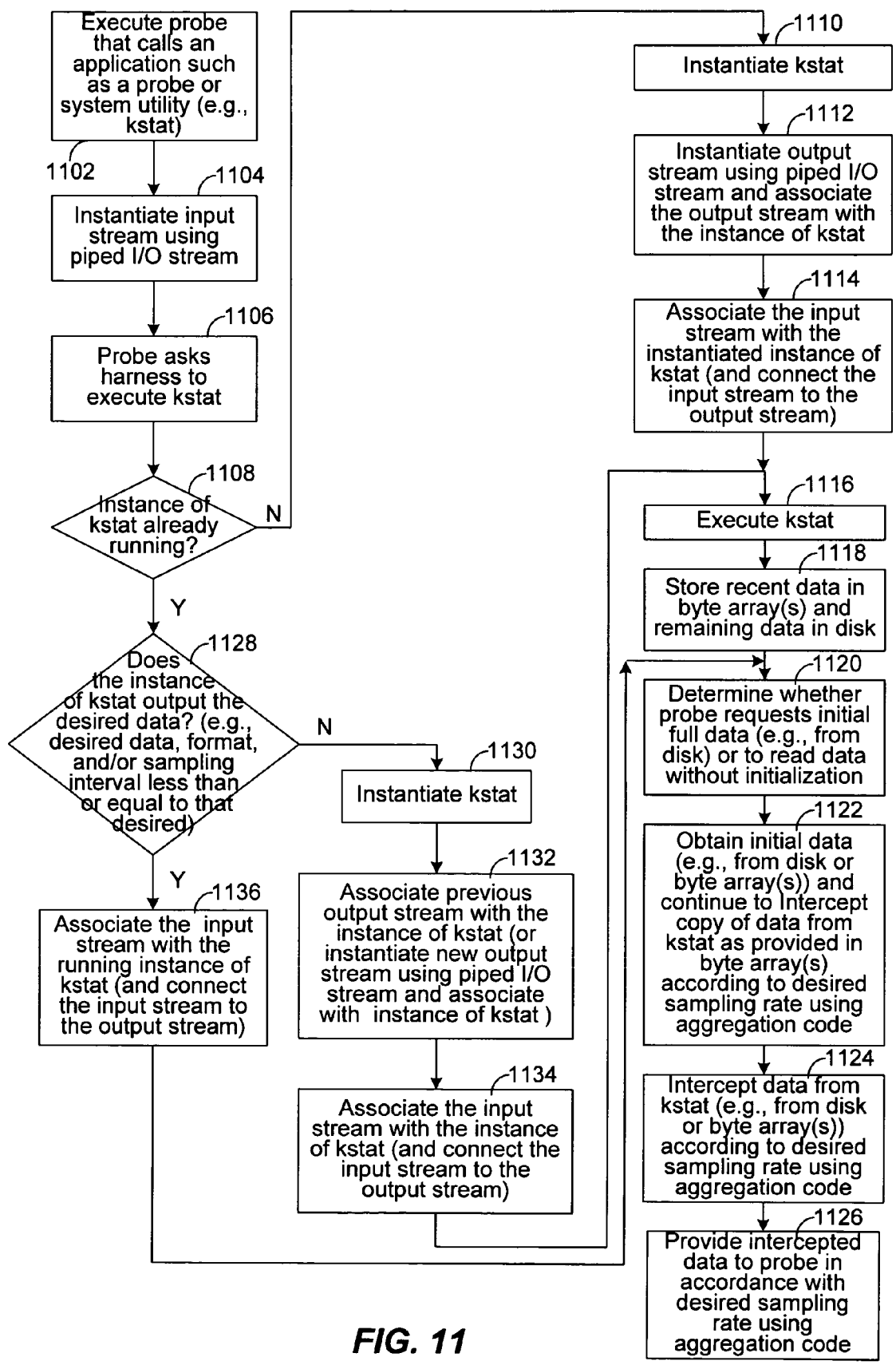
FIG. 11 is a process flow diagram illustrating a method of acquiring and sharing runtime statistics in accordance with various embodiments of the invention.

FIG. 11 is a process flow diagram illustrating a method of acquiring and sharing runtime statistics in accordance with various embodiments of the invention. As shown at block 1102, a probe that calls an application such as a probe or system utility (e.g., kstat) is executed. An input stream (e.g., PipedInputStream) is then instantiated at block 1104. The probe then requests that the user interface (i.e., harness) execute the application at block 1106. It is then determined whether the application (e.g., instance of the application) is executing at 1108.

If the application is not executing, the application is executed such that data provided by the application can be provided to multiple probes. Specifically, the application is instantiated at block 1110. An output stream (e.g., PipedOutputStream) is then instantiated and associated with the instance of the application at block 1112. For instance, an entry may be entered into a hash table such as that described above with reference to FIG. 9. The input stream is also associated with the appropriate probe and an instance of the application at block 1114. For instance, an entry may be entered into a lookup table such as that described above with reference to FIG. 10. In this manner, the input stream is connected to the output stream.

The instance of the application is then executed at block 1116. The data generated by the instance of the application is then stored at block 1118. The address(es) or reference to the appropriate address(es) at which the data is stored may then be stored in the appropriate entry in the hash and lookup tables as described above with reference to FIG. 10 and FIG. 11.

In addition, each probe when it starts up may request the full data generated by an instance or to continue to receive or read data without such initialization at block 1120. Thus, if the probe has requested the full data, the historical data stored in the disk and/or byte array(s) is obtained provided to the probe at block 1122. In addition, the most current data stored in the byte array(s) continues to be obtained and provided to the probe. The data is preferably obtained and provided to the probe according to the desired sampling rate using a set of aggregation code as described above. Otherwise, the process continues at block 1124 to intercept and obtain the data (e.g., from the byte array(s)), which is preferably sampled according to the desired sampling rate. The data may therefore be provided to the probe in accordance with the desired sampling rate at block 1126.

It may be determined at block 1108 that the application (e.g., instance of the application) is already executing. In other words, two or more probes call the application or request data from the application. When it is ascertained that the application is executing, data produced by the application is provided to this additional probe if data provided by the application can be shared by the requesting probes. In other words, at block 1128, it is determined whether the instance of the application that is executing produces the desired data. For instance, the format of the data may be checked against that requested. In addition, the sampling interval of the executing application is preferably less than or equal to that desired (e.g., requested by the probe). In other words, the rate at which data is provided by the application is greater than or equal to that desired.

If data provided by the executing application cannot be shared by the probes, the application is executed such that data provided by the application can be provided to the probes and the data produced by the application is distributed to the probes (e.g., by the aggregation code). For instance, the application is executed such that the sampling rate or rate at which data is provided is greater than or equal to that of data requested by the probes. Specifically, the application is instantiated at block 1130 with the desired sampling rate. The previous output stream is preferably associated with the instance of the application (e.g., kstat) at block 1132, thereby replacing the old instance with the new instance. Thus, if a new probe requests data from the same underlying system utility that is already executing, that system utility may be restarted with the new "least common denominator." Alternatively, a new output stream may be instantiated as described above and associated with the new instance of the application. For instance, a new key associated with the new instance of the application may be stored in the hash table as described above with reference to FIG. 9. In addition, the input stream is also associated with the new instance of the application at block 1134. For instance, a new key associated with the new instance of the application may be stored in the lookup table as described above with reference to FIG. 10. The process continues at block 1116 to execute the newly instantiated application and distribute data to the probe(s). In this manner, data produced by an application is distributed to multiple probes that call the application or request data from the application.

If data provided by the executing application can be shared by the probes, the input stream associated with the new probe (e.g., newly executing probe) is associated with the executing instance of the application (e.g., kstat) at block 1136. For instance, the appropriate key and memory location may be stored in a lookup table as described above with reference to FIG. 10. In this manner, the input stream may be connected to the output stream. The process continues at block 1120 to distribute data from the executing application to the probes that call the application or request data from the application.

As described above, the aggregation code provides data produced by the application to two or more probes. For instance, the aggregation code determines a sampling rate or rate at which data is requested by each of the two or more probes. Data produced by the application is then provided to each of the two or more probes at the sampling rate or rate at which data is requested by the corresponding one of the two or probes. As one example, the data may be sampled at the highest rate required by the probes. In other words, the data is sampled at the smallest time interval. The data may then be stored as well as distributed to those probes requesting a higher sampling rate (i.e., smaller sampling interval).

The probes requesting data (e.g., runtime statistics) from the same application may be executed simultaneously. However, execution of the probes may not be initiated simultaneously. In other words, they may request data from the application at different times. As a result, one or more instances of the application may be instantiated as necessary at different times. Accordingly, initiation of execution of the instances of the application need not be performed simultaneously.

Typically, runtime data is generated through the sampling of data and averaging of the sampled data. As a result, the accuracy of the runtime data that is generated depends upon the sampling rate and the time periods during which the data is sampled. However, the underlying hardware may limit the number of processes that may execute simultaneously. Thus, methods and apparatus for alternating multiple processes to obtain the desired data are disclosed. Moreover, the degree of accuracy of the data obtained by a single process (as well as multiple processes) may be increased.

Figure 12:
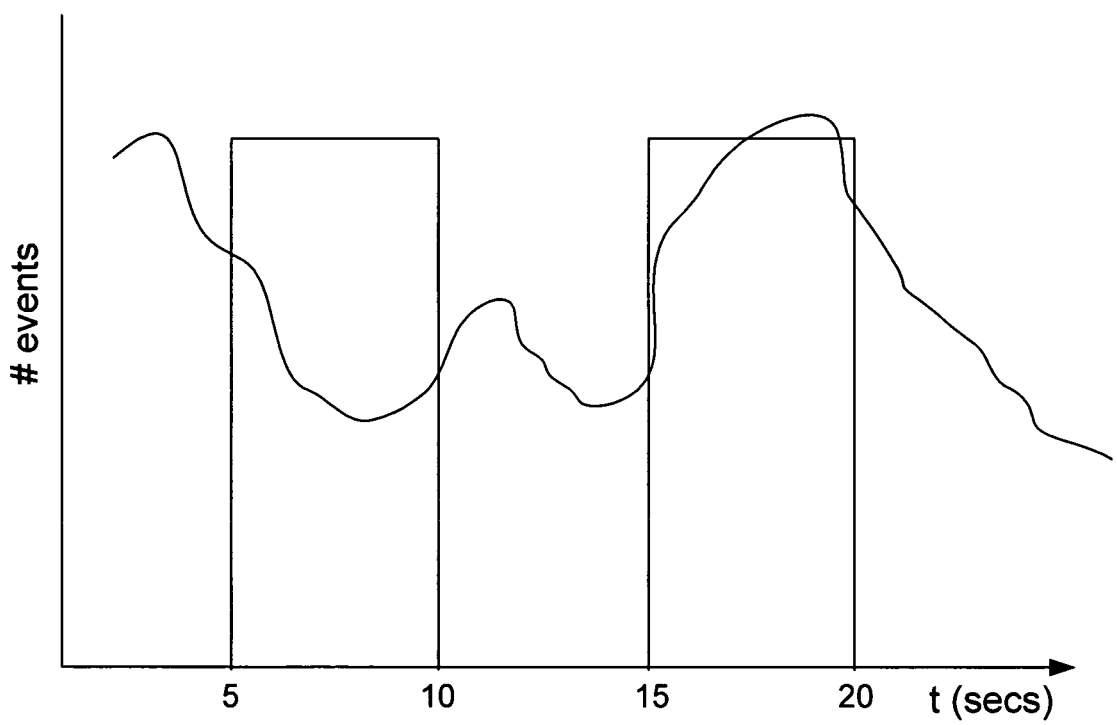
FIG. 12 is a diagram illustrating runtime data sampled in accordance with prior art methods.

FIG. 12 is a diagram illustrating runtime data sampled in accordance with prior art methods. Since the number of hardware registers or other hardware may be limited, it may be impossible to execute two or more processes simultaneously that require this hardware in order to perform various computations. As a result, these processes are typically run sequentially.

As shown in FIG. 12, the time during which data is sampled is shown along the x-axis and the number of events are represented along the y-axis. If a particular application calculates the number of cycles per instruction (CPI), the first hardware register will be used to store the Cycle_Cnt, while the second hardware register will be used to store the instruction count. If another second application calculates different runtime statistics (e.g., TLB Misses), this second application typically cannot execute until the hardware registers are available. This means that the first application must traditionally complete its execution in order for the second application to execute. As a result, the first application executes for a period of time (e.g., 5 seconds), as specified by the user. In this example, the first application executes from time 0-5 seconds. The second application may then execute for a period of time (e.g., 5 seconds), as specified by the user. As shown, the second application executes from time 5-10 seconds. Thus, the first application is executed from 0-5 seconds and 10-15 seconds, while the second application is executed from 5-10 seconds and 15-20 seconds. As a result, each application misses data during alternating 5 second periods of time. Accordingly, the accuracy of the data obtained by each process is limited by the data that is not obtained during those periods of time. Moreover, the accuracy of the data diminishes as we begin to calculate more and more performance data (e.g., from the same probe).

Figure 13:
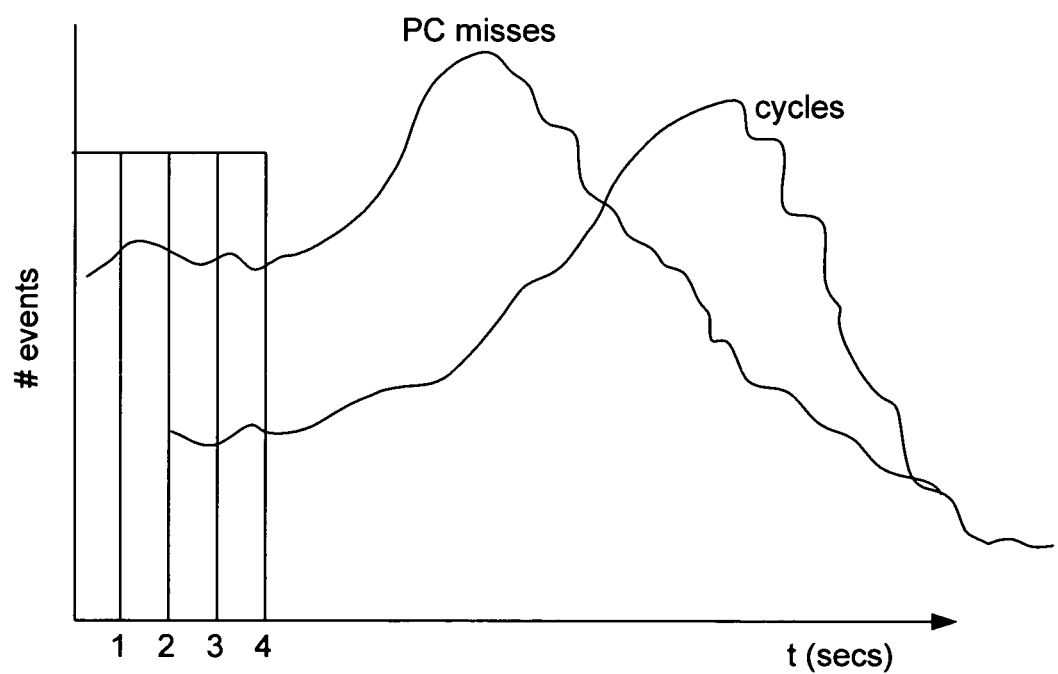
FIG. 13 is a diagram illustrating runtime data sampled in accordance with various embodiments of the invention.

FIG. 13 is a diagram illustrating runtime data sampled in accordance with various embodiments of the invention. In accordance with various embodiments of the invention, two different applications are alternated during the total specified time during which data is requested to be sampled. In addition, the sampling rate is increased for both applications and the sampling of data by the two applications is alternated during the total specified time. For instance, if the total time is 10 seconds, the sampling rate is increased for both applications and the sampling may be alternated every 1 second, as shown. In other words, the first application samples data for 1 second, then the second application samples data for 1 second, and so on. As a result, the accuracy of the data obtained as well as the resulting statistical average is increased.

Each of the applications may be a probe or system utility, as described above. For instance, the system utility may be an operating system utility and/or a statistics gathering utility.

Figure 14:
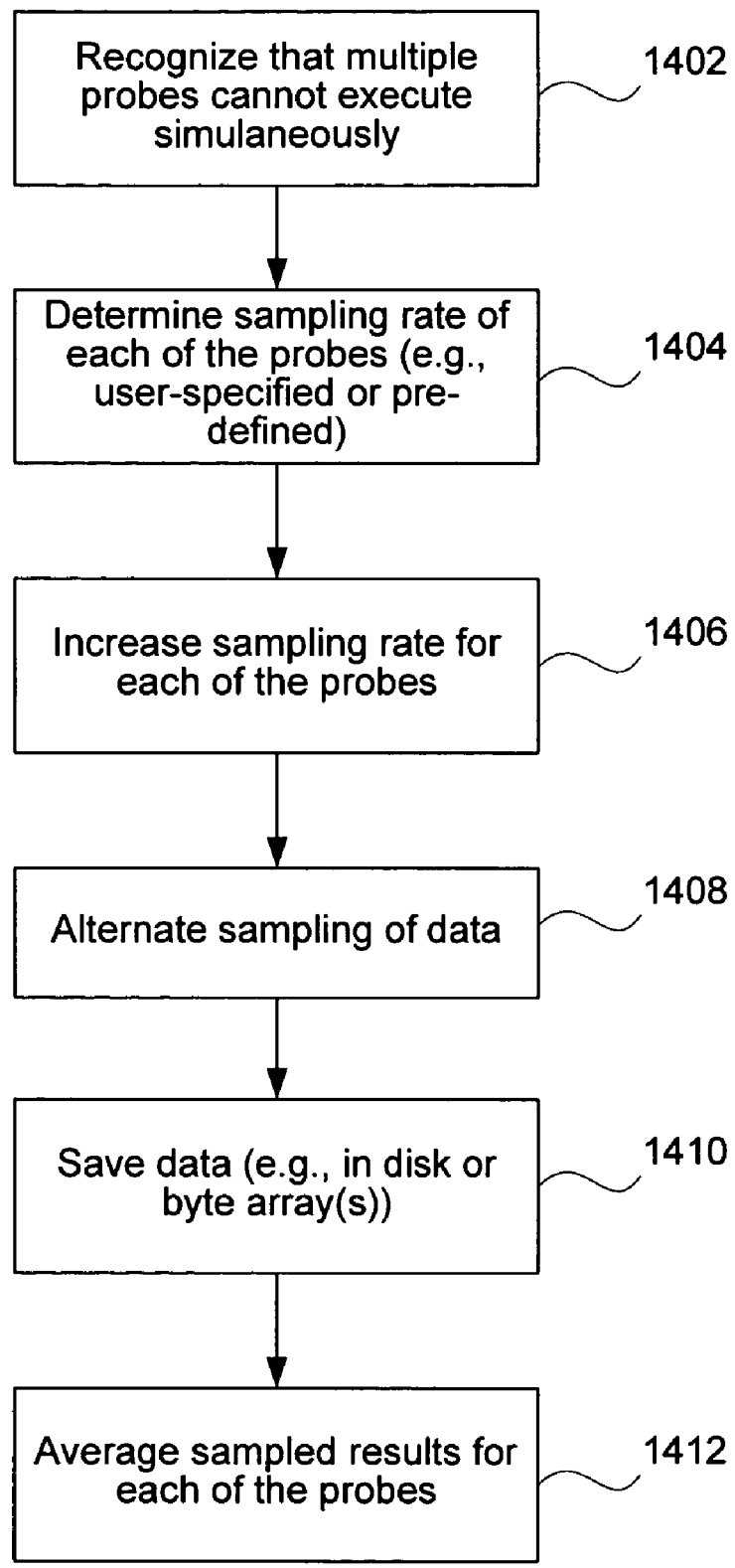
FIG. 14 is a process flow diagram illustrating a method of sampling data to enhance statistical performance in accordance with various embodiments of the invention.

FIG. 14 is a process flow diagram illustrating a method of sampling data to enhance statistical performance in accordance with various embodiments of the invention. As shown at block 1402, it is first determined that the two or more applications (e.g., probes) cannot execute simultaneously, wherein each of the applications samples data. A sampling rate of each of the probes is then determined at block 1404. For instance, the sampling rate may be user-specified or predefined. In order to ascertain the sampling rate, the sampling time interval may be obtained. In addition, the total number of samples requested for each of the applications may be obtained. Moreover, the total period of time for a particular application may be obtained by multiplying the sampling time interval by the total number of samples requested.

The sampling rate for each of the two or more applications is then increased at block 1406. In order to increase the sampling rate, the total number of samples to be obtained may be increased. In addition, the sampling time interval may be reduced. The sampling rate need not be identical for the applications. However, the increased sampling rate may correspond to the number of columns of data that are generated. For instance, the sampling rate may be divided by two for two columns of data, divided by three for three columns, etc. The sampling time interval will therefore be reduced (e.g., from 5 to 1 second), and will preferably be the same for all of the applications.

The sampling of data by the two or more applications is then alternated at block 1408 at the increased sampling rate over a period of time. For instance, the period of time that sampling has been requested may be multiplied by the number of applications to ascertain a total sampling time for all of the applications. This total sampling time may then be divided into time intervals over which sampling of data will be alternated among the applications.

Each of the applications (e.g., probes) may sample data from a different data source as well as the same data source. For instance, the applications may sample data stored in hardware registers. As another example, data generated by other applications may be sampled.

After or during the sampling of data, the data that is sampled by the two or more applications is stored as shown at block 1410. For instance, the data may be stored to disk and/or to temporary storage (e.g., byte array(s)) as described above. The data that is sampled by each of the applications may then be averaged at block 1412 such that an average sampled value is obtained for each of the applications.

In accordance with one embodiment, a wrapper such as a Java™ wrapper is generated for one or more of the applications at the increased sampling rate. Each Java wrapper executes one or more of the applications over non-sequential segments of time during the period of time at the increased sampling rate. In other words, the non-sequential segments of time are smaller time intervals than that specified by any one of the applications. In addition, the Java wrapper may average the data that is sampled by the one or more of the applications such that an average sampled value is obtained for each of the one or more of the applications.

Figure 15:
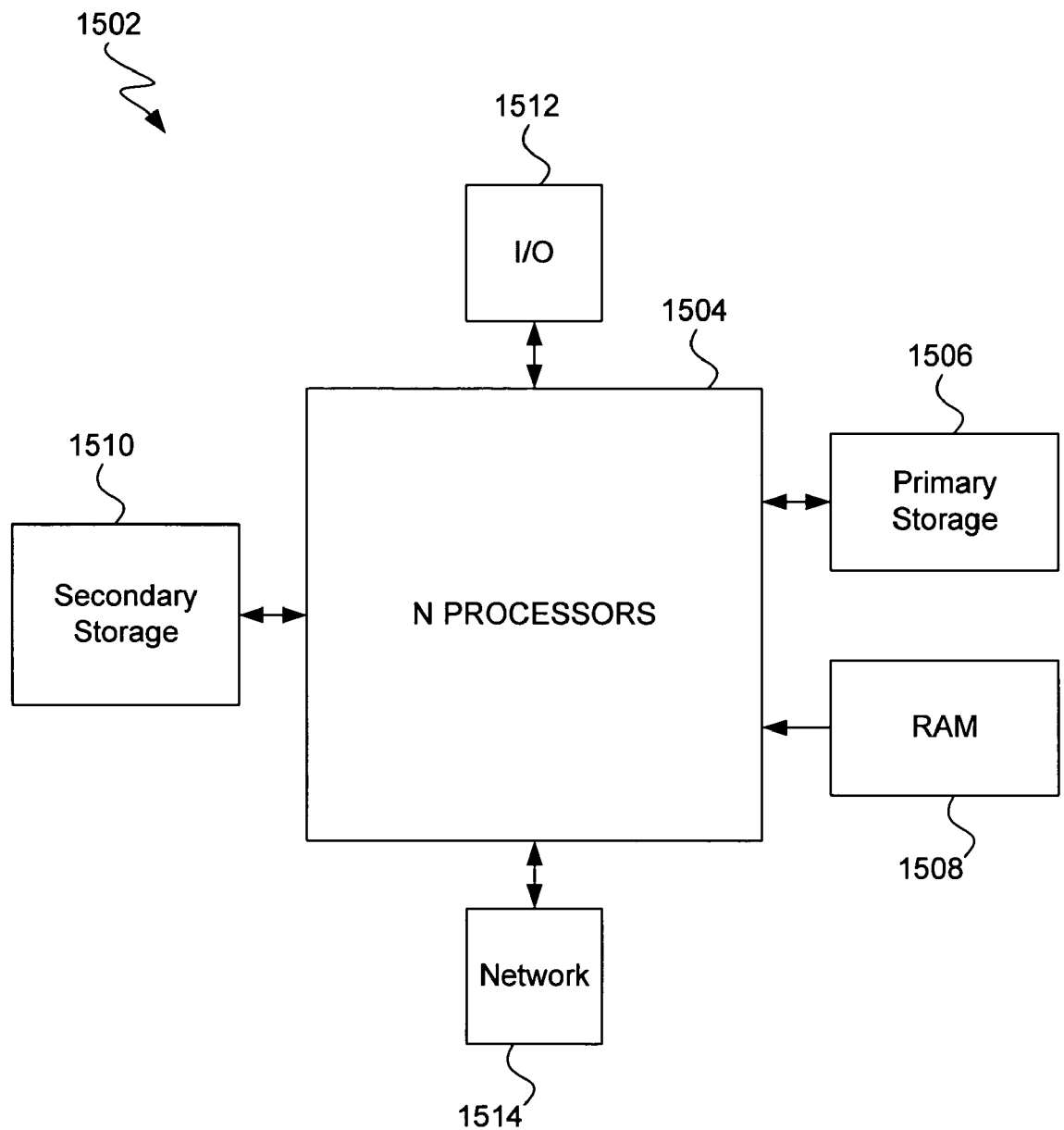
FIG. 15 is a block diagram illustrating a typical, general-purpose computer system suitable for implementing the present invention.

The present invention may be implemented on any suitable computer system. FIG. 15 illustrates a typical, general-purpose computer system 1502 suitable for implementing the present invention. The computer system may take any suitable form.

Computer system 1530 or, more specifically, CPUs 1532, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. However, the present invention may be implemented in a variety of ways. Moreover, the above described process blocks are illustrative only. Therefore, the implementation may be performed using alternate process blocks as well as alternate data structures. Moreover, it may be desirable to use additional servers, such as a HTTP web server, in order to perform various processes (e.g., setup).

Accordingly, the present embodiments are to be considered as illustrative and not restrictive, and the invention is not to be limited to the details given herein, but may be modified within the scope and equivalents of the appended claims.

What is claimed is:

1. A computer implemented method of determining a level of performance of a first application in a computer system, the method to be performed on a computer comprising the operations of:

receiving a first performance probe from a plurality performance probes, each of the plurality of performance probes adapted for producing data indicating one or more levels of performance of the first application;

executing the first performance probe, thereby producing data indicating the one or more levels of performance of the first application;

providing documentation associated with the first performance probe describing a manner of interpreting the data indicating the one or more levels of performance of the first application;

suggesting execution of at least one of the plurality of performance probes that can provide additional information to assess the one or more levels of performance of the first application; and obtaining one or more levels of performance of the first application based on obtaining additional information from execution of the at least one of the plurality of performance probes that can provide additional information to assess the one or more levels of performance of the first application.

2. The method as recited in claim 1, wherein the first application is a user application or system utility.

3. The method as recited in claim 1, further comprising:
executing the at least one of the plurality of performance probes.

4. The method as recited in claim 3, further comprising:
selecting the at least one of the plurality of performance probes from within the documentation provided.

5. The method as recited in claim 1, wherein the documentation provided corresponds to a range of values of the data.

6. The method as recited in claim 1, wherein the documentation provided comprises a first set of documentation associated with a first range of values and a second set of documentation associated with a second range of values.

7. The method as recited in claim 1, wherein the at least one of the plurality of performance probes suggested corresponds to a range of values of the data produced.

8. The method as recited in claim 1, wherein the at least one of the plurality of performance probes suggested comprises a first set of at least one performance probe associated with a first range of values and a second set of at least one performance probe associated with a second range of values.

9. The method as recited in claim 1, further comprising:
receiving a second performance probe to be included in the plurality of performance probes.

10. The method as recited in claim 9, wherein the second performance probe has an associated set of specifications.

11. The method as recited in claim 10, wherein the set of specifications comprises at least one of an email address of a user submitting the second performance probe, a description of the second performance probe, source code associated with the second performance probe, executable code associated with the second performance probe, and prerequisites to executing the second performance probe.

12. The method as recited in claim 10, further comprising: uploading the second performance probe to a server.

13. The method as recited in claim 10, wherein the set of specifications is to be reviewed prior to including the second performance probe in the plurality of performance probes.

14. The method as recited in claim 9, further comprising: including the second performance probe in the plurality of performance probes, thereby enabling the second performance probe to be selected for subsequent execution.

15. The method as recited in claim 9, further comprising: rejecting the second performance probe, wherein the second performance probe is not included in the plurality of performance probes.

16. The method as recited in claim 15, wherein the second performance probe has an associated set of specifications, wherein rejecting the second performance probe is performed after review of the set of specifications is performed.

17. The method as recited in claim 1, wherein the plurality of performance probes are stored on a server, wherein a first subset of the plurality of performance probes is associated with and accessible by a first customer and a second subset of the plurality of performance probes is associated with and accessible by a second customer.

18. The method as recited in claim 17, further comprising: downloading the second subset of the plurality of performance probes from the server.

19. The method as recited in claim 1, further comprising: uploading the data produced to a server, wherein the data is accessible by a specified customer.

20. The method as recited in claim 1, further comprising: displaying the data produced.

21. The method as recited in claim 20, wherein the data is displayed in at least one of a tabular format and a graph format.

22. The method as recited in claim 1, further comprising: performing one or more arithmetic operations on the data produced to produce modified data.

23. The method as recited in claim 22, further comprising displaying the modified data.

24. The method as recited in claim 1, further comprising: discarding at least a portion of the data produced.

25. The method as recited in claim 24, further comprising: displaying the remaining data.

26. The method as recited in claim 1, wherein the data is output data or runtime data.

27. A tangible computer-readable medium storing thereon computer-readable instructions for determining a level of performance of a first application in a computer system, comprising:
    instructions for receiving a selection of a first performance probe of a plurality of performance probes, each of the plurality of performance probes adapted for producing data indicating one or more levels of performance of an application;
    instructions for executing the first performance probe, thereby producing data indicating the one or more levels of performance of the first application;
    instructions for providing documentation associated with the first performance probe, the documentation indicating at least one of a manner of interpreting data indicating the one or more levels of performance of the first application;
    instructions for suggesting execution of one or more of the plurality of performance probes that can provide additional information to assess the one or more levels of performance of the first application; and
    instructions for obtaining one or more levels of performance of the first application based on obtaining additional information from execution of the at least one of the plurality of performance probes that can provide additional information to assess the one or more levels of performance of the first application.

28. An apparatus for determining a level of performance of a first application in a computer system, comprising:
    means for receiving a selection of a first performance probe of a plurality of performance probes, each of the plurality of performance probes adapted for producing data indicating one or more levels of performance of an application;
    means for executing the first performance probe, thereby producing data indicating the one or more levels of performance of the first application;
    means for providing documentation associated with the first performance probe, the documentation indicating at least one of a manner of interpreting data indicating the one or more levels of performance of the first application;
    means for suggesting execution of one or more of the plurality of performance probes that can provide additional information to assess the one or more levels of performance of the first application; and
    means for obtaining one or more levels of performance of the first application based on obtaining additional information from execution of the at least one of the plurality of performance probes that can provide additional information to assess the one or more levels of performance of the first application.

29. An apparatus for determining a level of performance of a first application in a computer system, comprising:
    a processor; and a memory, at least one of the processor and the memory being adapted for:
        receiving a selection of a first performance probe of a plurality of performance probes, each of the plurality of performance probes adapted for producing data indicating one or more levels of performance of an application;
        executing the first performance probe, thereby producing data indicating the one or more levels of performance of the first application;
        providing documentation associated with the first performance probe, the documentation indicating at least one of a manner of interpreting data indicating the one or more levels of performance of the first application; and
        suggesting execution of one or more of the plurality of performance probes that can provide additional information to assess the one or more levels of performance of the first application; and
        obtaining one or more levels of performance of the first application based on obtaining additional information from execution of the at least one of the plurality of performance probes that can provide additional information to assess the one or more levels of performance of the first application.

* * * * *